United States Patent
Hassanain et al.

(10) Patent No.: US 11,870,648 B1
(45) Date of Patent: Jan. 9, 2024

(54) SYSTEM AND METHOD FOR SYSTEMATICALLY MANAGING NETWORK DEVICES

(71) Applicant: SAUDI ARABIAN OIL COMPANY, Dhahran (SA)

(72) Inventors: Rayan Mohammedhassan M Hassanain, Dhahran (SA); Mohammad Abbas Yagoub, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/321,558

(22) Filed: May 22, 2023

(51) Int. Cl.
*H04L 41/082* (2022.01)
*H04L 41/16* (2022.01)
*H04L 41/22* (2022.01)

(52) U.S. Cl.
CPC ............ *H04L 41/082* (2013.01); *H04L 41/16* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 6,714,513 B1 * | 3/2004 | Joiner ..................... | H04L 43/00 370/224 |
| 7,827,252 B2 | 11/2010 | Hopmann et al. | |
| 8,108,495 B1 | 1/2012 | Zuk et al. | |
| 8,432,898 B2 * | 4/2013 | Samele ................ | H04Q 3/0087 379/27.05 |
| 8,484,565 B2 | 7/2013 | Yamashita | |
| 8,745,198 B2 * | 6/2014 | Wen ..................... | H04L 63/1408 709/224 |
| 9,219,756 B2 * | 12/2015 | Wåhl .................... | H04L 67/146 |
| 9,449,278 B2 * | 9/2016 | Davlos .................... | G06N 5/04 |
| 10,080,149 B2 * | 9/2018 | Anderson ............... | H04W 4/02 |
| 10,263,836 B2 * | 4/2019 | Jain ..................... | H04L 41/0686 |
| 10,740,169 B1 * | 8/2020 | Passaretti ............ | G06F 11/0709 |
| 10,901,834 B2 * | 1/2021 | Abhinav ................. | G06V 20/20 |
| 11,522,782 B2 * | 12/2022 | Hegde ................... | H04L 43/065 |
| 11,562,227 B2 * | 1/2023 | Abhinav .................. | G06N 3/08 |
| 2005/0015644 A1 * | 1/2005 | Chu ....................... | H04L 41/069 714/4.1 |
| 2010/0100778 A1 * | 4/2010 | Sullivan .................. | H04L 67/00 709/224 |
| 2011/0145822 A1 * | 6/2011 | Rowe ..................... | G06Q 10/10 718/100 |
| 2014/0310222 A1 * | 10/2014 | Davlos ................ | G06F 11/2294 706/46 |
| 2020/0293421 A1 * | 9/2020 | Hamdi ................ | G06F 9/45558 |

\* cited by examiner

*Primary Examiner* — Backhean Tiv
(74) *Attorney, Agent, or Firm* — Leason Ellis LLP

(57) ABSTRACT

A system and method systematically manage network devices. A memory stores a solution inventory list of network solutions of the network devices. An input/output device receives Internet Protocol (IP) addresses and commands. A parsing system validates the IP addresses and commands, and searches the solution inventory list for solutions based on the IP addresses. An interactive system performs natural language processing of interactions with the network devices, sets a timeout period, and executes the commands to implement the found solutions. A reporting system generates a report indicating that the commands are successfully executed. The input/output device outputs the report. A method implements the system.

15 Claims, 5 Drawing Sheets

SYSTEM AND METHOD FOR SYSTEMATICALLY MANAGING NETWORK DEVICES

FIELD OF THE DISCLOSURE

The present disclosure relates generally to managing network devices, and, more particularly, to a system and method for systematically managing network devices.

BACKGROUND OF THE DISCLOSURE

Network devices are typically configured on an ad hoc basis, with each network device in a network configured individually and often manually, one-by-one and one at a time, which is an inefficient use of the time of system administrators. The configuration of network devices can include resetting local passwords, commissioning network devices with required configurations, installing and implementing new network devices, and closing vulnerabilities of the network devices. Such individual configuring methods are prone to human error as well as prone to security risks as some network devices wait for the system administrator to finish configuring one network device before moving on to the next network device.

SUMMARY OF THE DISCLOSURE

According to an embodiment consistent with the present disclosure, a system and method systematically manage network devices.

In an embodiment, a network management system is operatively connected to a plurality of network devices, and comprises a memory, an input/output device, a parsing system, an interactive system, and a reporting system. The memory is configured to store a solution inventory list of network solutions of the network devices. The input/output device has a first processor including first code therein configured to receive Internet Protocol (IP) addresses and to receive commands. The parsing system has a second processor including second code therein configured to check the case that the IP addresses and the commands are valid, and to search the solution inventory list for found solutions associated with the plurality of network devices based on the IP addresses. The interactive system has a third processor including third code therein configured to interact with the plurality of network devices, to perform natural language processing of the interactions with the plurality of network devices, to set a timeout period, and to execute the commands to implement the found solutions to the network devices to configure the network devices during the timeout period. The reporting system has a fourth processor including fourth code therein configured to generate a report indicating the case that the commands are successfully executed. The input/output device is configured to output the report.

The input/output device can include an interactive display configured to display a graphical user interface (GUI). The GUI can include a plurality of input fields configured to receive text corresponding to the IP addresses and the commands. Alternatively, the GUI can include a progress bar configured to represent a progress of execution of the commands. The parsing system can be configured to check the IP addresses using a regular expression (REGEX) method. The interactive system can be configured to perform the natural language processing using a trained neural network. The interactive system can be configured to set the timeout period using a predetermined timeout formula. The interactive system can be configured to encrypt communications between the interactive system and the plurality of network devices using a secure shell (SSH) library. The report can have a format selected from the group consisting of: Portable Data Format (PDF), HyperText Markup Language (HTML), Standard Generalized Markup Language (SGML), Extensible Markup Language (XML), text, and Email.

In another embodiment, a method comprises storing a solution inventory list of network solutions of network devices in a memory, receiving Internet Protocol (IP) addresses and commands, validating the IP addresses and commands, searching the solution inventory list for found solutions based on the IP addresses, performing natural language processing of interactions with the network devices, setting a timeout period, and executing the commands to implement the found solutions to configure the network devices during the timeout period.

The method can further comprise displaying a graphic user interface having a plurality of input fields on a display, wherein the receiving step can include receiving the IP addresses and commands in the plurality of input fields. Alternatively, the method can further comprise generating a report indicating successful execution of the commands, and outputting the report to a user through an output device. In another alternative embodiment, the method can further comprise providing a trained neural network, and wherein the performing the natural language processing of interactions includes applying the interactions to the trained neural network to detect errors in the found solutions. The step of executing the commands can further comprise communicating with the network devices using Secure Shell (SSH) communications. The step of setting can include setting the timeout period using a predetermined formula.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for systematically managing network devices.

Figure 1:
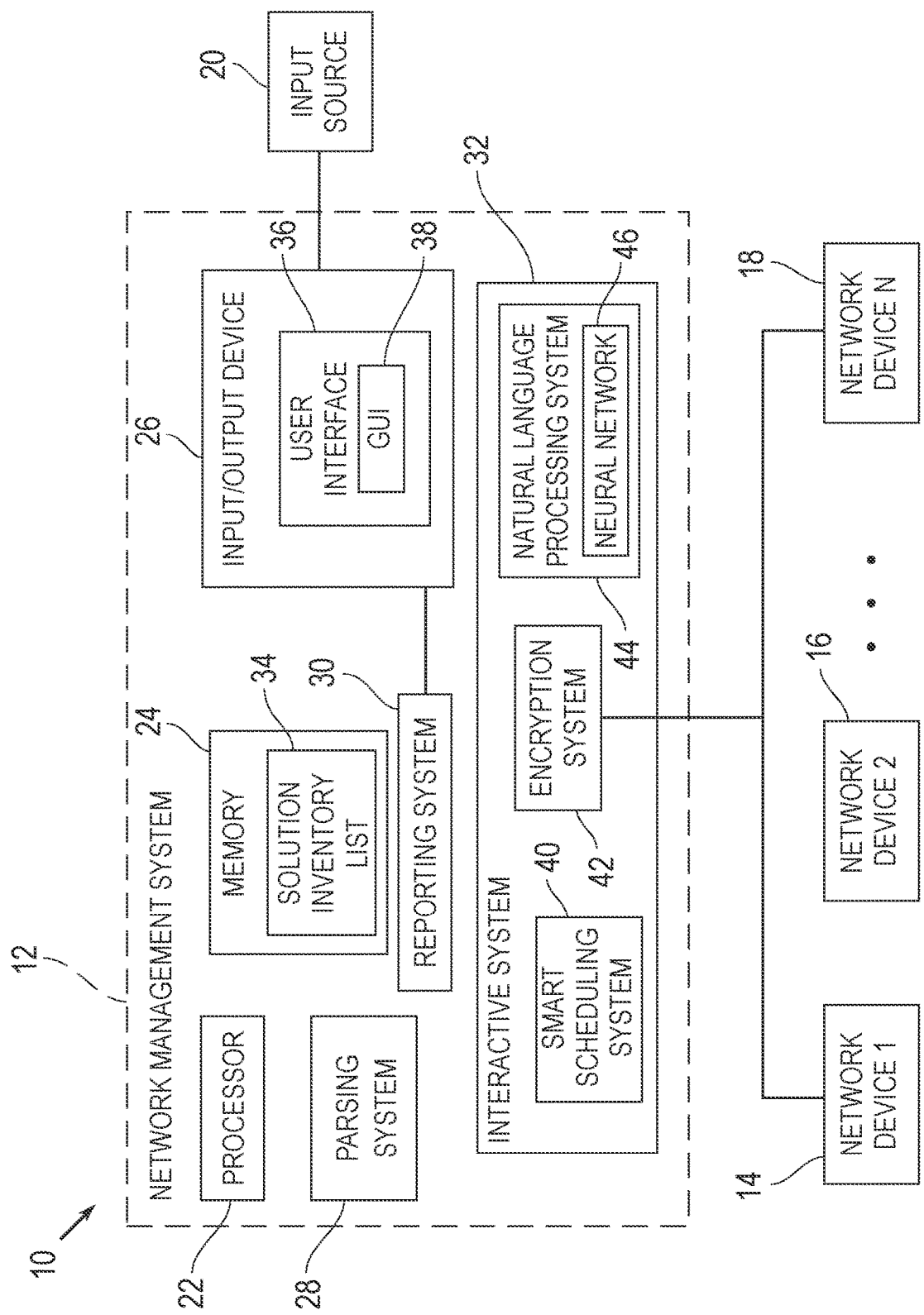
FIG. 1 is a schematic of a system, according to an embodiment.

As shown in FIG. 1, a system 10 includes a network management system 12 operatively connected to a plurality of network devices 14, 16, 18. Each network device 14, 16, 18 can be a computing device configured to communicate with users or with other computing devices. For example, a network device can be a hub for other computing devices. The network management system 12 is also connected to an external input source 20. The external input source 20 can be a computing device configured to provide information to the network management system 12. For example, the input source 20 provide a commercial security product configured to protect at least one of the network devices 14, 16, 18. Alternatively, the input source 20 can provide an open-source solution to configure at least one of the network devices 14, 16, 18. In another alternative embodiment, the input source 20 can be information configured to provide direct analyst access to automate various tasks to be performed on at least one of the network devices 14, 16, 18.

The network management system 12 can be operatively connected to the components 14, 16, 18, 20 by communication channels, such as a network. The communication channels can include wired communications. Alternatively, the communication channels can be wireless communications. In other alternative embodiments, the communication channels can be implemented by an Ethernet, Wi-Fi, Bluetooth, or USB interface. The communication channels can be implemented by any known communication channel devices and communication protocols. The communication channels configured as the network can include the Internet. Alternatively, the communication channels configured as the network can be an intranet of an organization. In a further alternative embodiment, the communication channels configured as the network can be any known network having the network devices 14, 16, 18 and other connected devices such as the input source 20.

The processor 22 can be any known processing device or system, as described below, with code or instructions configured to perform network management of the network devices 14, 16, 18. The processor 22 can coordinate and control the operations of the components 24-46 of the network management system 12, as described below. The memory 24 can be any known data storage device or system, as described below. The memory 24 is configured to store a solution inventory list 34. The solution inventory list 34 stores network device solutions to configure respective network devices. The input/output device 26 can be any known information management device, as described below, configured to receive inputs and data and to output data. In an alternative embodiment, the input/output device 26 can include an input device separate from an output device, with the input device configured to receive inputs and data, and the output device configured to output data. The input/output device 26 is further configured to interact with a user. The inputs received by the input/output device 26 can be data or commands from the user, such as a system administrator of the system 10. The system administrator can interact with the network management system 12 to control and configure the network devices 14, 16, 18. The data received by the input/output device 26 can be data from an input source 20, as described below. For example, the received data can include a list of Internet Protocol (IP) addresses of all network devices 14, 16, 18. In addition, the received data can include a list of commands configured to control the network management system 12 to manage the network devices 14, 16, 18. The input source 20 can be operatively connected to the input/output device 26 using a known communication channel, as described herein.

Figure 3:
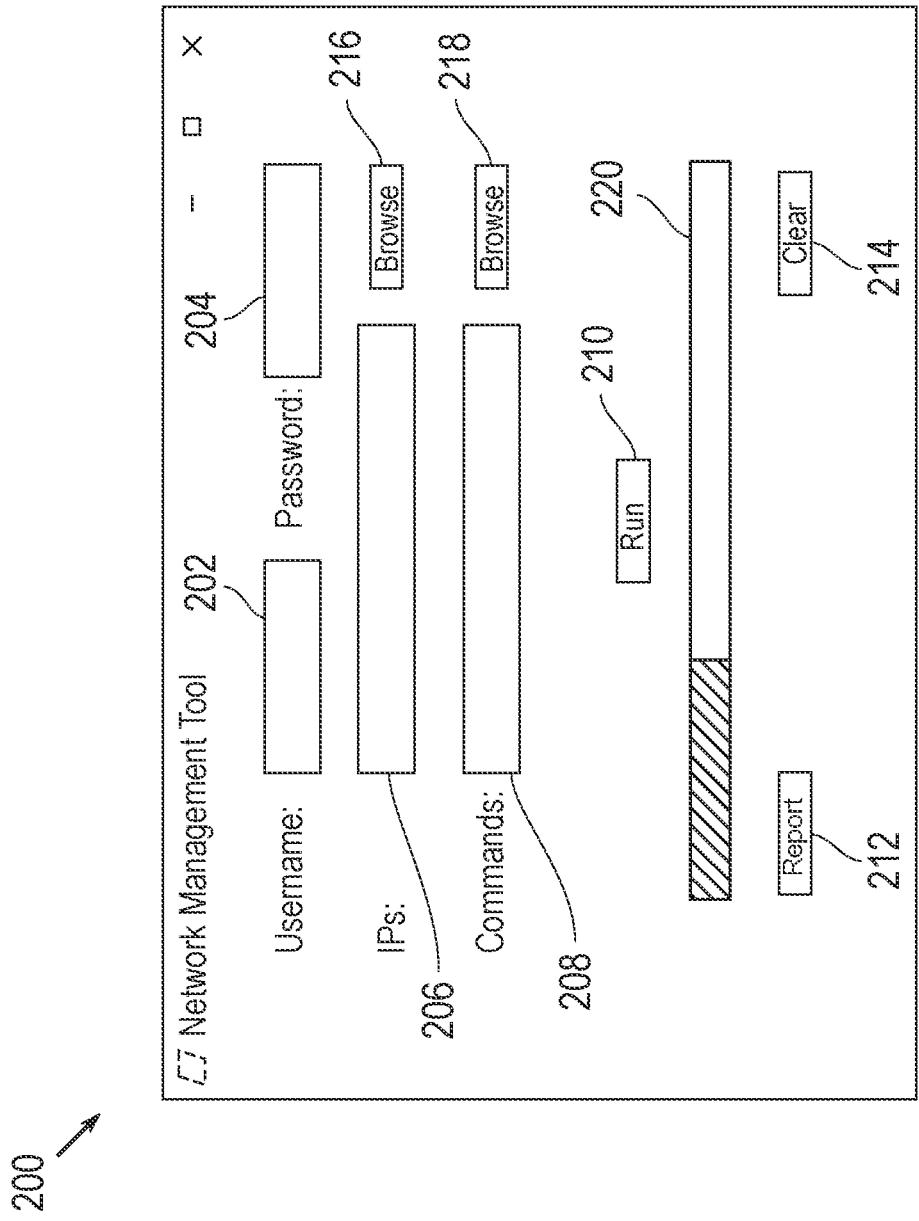
FIG. 3 is a screenshot of a user interface of the system of FIG. 1.

The outputs of the input/output device 26 can be data or information displayed or otherwise conveyed to a user, as described below. The input/output device 26 can be configured to operate using an application programming interface (API). For example, the API can include a representational state transfer (RESTful) API configured to allow interfacing with any known input sources, such as the input source 20. The input/output device 26 is provided with a user interface (UI) 36. The user interface 36 can be any known user interface. The input/output device 26 can include an interactive display, and the input/output device 26 can be configured to display a graphic user interface (GUI) 38 through the user interface 36. For example, the graphic user interface 38 can include data such as text and actuatable icons as shown in FIG. 3, as described below. The graphic user interface 38 can be implemented using MICROSOFT POWERSHELL.

The parsing system 28 is configured to parse a user input received through the input/output device 26. The parsing system 28 is further configured to check if the received user input is valid. The parsing system 28 is configured to check a received IP address using a known IP address validation system or method, to determine whether the received IP address conforms to a known IP address convention. For example, the parsing system 28 can use a known regular expression (REGEX) or a rational expression IP address validation method. In addition, the parsing system 28 is configured to determine if a syntax of an IP address or a command is correct based on the type of network device 14, 16, 18 associated with the IP address.

The reporting system 30 is configured to generate a report in a known format. For example, the report can be in the Portable Document Format (PDF), can be in HyperText Markup Language (HTML), can be in Standard Generalized Markup language (SGML), can be in Extensible Markup Language (XML), can be text, or can be an Email. The reporting system 30 is operatively connected to the input/output device 26. The reporting system 30 can also be configured to send a generated report to the input/output device 26 to be output to a user. For example, the generated report can include information to allow an analyst or a system administrator to check whether input commands were successfully executed. The parsing system 28 is configured to determine a network solution based on the solution inventory list 34 stored in the memory 24. The solution inventory list 34 can include network solutions from an Intrusion Prevention System (IPS) and from Next Generations Firewalls (NGFW).

The interactive system 32 is configured to interact with at least one of the network devices 14, 16, 18, and to detect errors. The interactive system 32 can include a smart scheduling system an encryption system 42, and a natural language processing (NLP) system 44, as described below. The encryption system 42 can perform Secure Shell (SSH) communications. For example, the encryption system 42 can utilize the POWERSHELL-based SSH (PoSH-SSH) library for communications. The natural language processing system 44 can further include a neural network 46, as described below.

In an alternative embodiment, the system 10 can also include a logging system configured to monitor, log, and analyze the execution of at least the components 26, 28, 30, 32 of the network management system 12 to facilitate access control, threat evaluation, and overall system maintenance.

Figure 2:
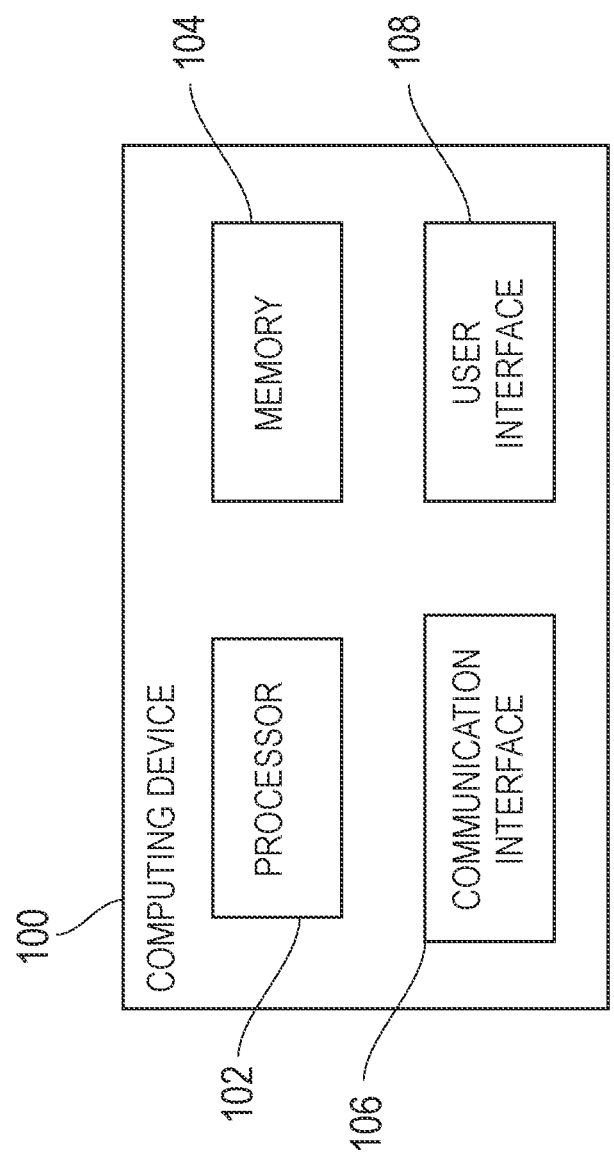
FIG. 2 is a schematic of a computing device used in the system of FIG. 1.

FIG. 2 illustrates a schematic of a computing device 100 including a processor 102 having code therein, a memory 104, and a communication interface 106. Optionally, the computing device 100 can include a user interface 108. The processor 102, the memory 104, the communication interface 106, and the user interface 108 can be operatively connected to each other via any known connections, such as a system bus, a network, etc. Any component or combination of components of the system 10 in FIG. 1 can be implemented by a respective computing device 100. For example, each of network management system 12, the network devices 14, 16, 18, the input/output device 26, the parsing system 28, the reporting system 30, the interactive system 32, the smart scheduling system 40, the encryption system 42, the natural language processing system 44, and the neural network 46 shown in FIG. 1 can be implemented by a respective computing device 100 shown in FIG. 2 and described below.

It is to be understood that the computing device 100 can include different components. Alternatively, the computing device 100 can include additional components. In another alternative embodiment, some or all of the functions of a given component can instead be carried out by one or more different components. The computing device 100 can be implemented by a virtual computing device. Alternatively, the computing device 100 can be implemented by one or more computing resources in a cloud computing environment. Additionally, the computing device 100 can be implemented by a plurality of any known computing devices.

The processor 102 can include one or more general-purpose processors. Alternatively, the processor 102 can include one or more special-purpose processors. The processor 102 can be integrated in whole or in part with the memory 104, the communication interface 106, and the user interface 108. In another alternative embodiment, the processor 102 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 102 can include a plurality of processing elements configured to perform parallel processing. In a further alternative embodiment, the processor 102 can include a plurality of nodes or artificial neurons configured as an artificial neural network. The processor 102 can be configured to implement any known artificial neural network, including a convolutional neural network (CNN).

The memory 104 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 102 can be stored in a memory internal to the processor 102. The code can be instructions implemented in the hardware processor 102. In alternative implementations, the code can be instructions implemented in software. The instructions can be machine-language instructions executable by the processor 102 to cause the computing device 100 to perform the functions of the computing device 100 described herein. Alternatively, the instructions can include script instructions executable by a script interpreter configured to cause the processor 102 and computing device 100 to execute the instructions specified in the script instructions. In another alternative embodiment, the instructions are executable by the processor 102 to cause the computing device 100 to execute an artificial neural network.

The memory 104 can store data in any known format, such as databases, data structures, data lakes, or network parameters of a neural network. The data can be stored in a table, a flat file, data in a filesystem, a heap file, a B+ tree, a hash table, or a hash bucket. The memory 104 can be implemented by any known memory, including random access memory (RAM), cache memory, register memory, or any other known memory device configured to store instructions or data for rapid access by the processor 102, including storage of instructions during execution.

The communication interface 106 can be any known device configured to perform the communication interface functions of the computing device 100 described herein. The communication interface 106 can implement wired communication between the computing device 100 and another entity. Alternatively, the communication interface 106 can implement wireless communication between the computing device 100 and another entity. The communication interface 106 can be implemented by an Ethernet, Wi-Fi, Bluetooth, or USB interface. The communication interface 106 can transmit and receive data over the network 14 and to other devices using any known communication link or communication protocol.

The user interface 108 can be any known device configured to perform user input and output functions, to implement the user interface 36 and the graphic user interface 38 shown in FIG. 1. The user interface 108 can be configured to receive an input from a user. Alternatively, the user interface 108 can be configured to output information to the user. The user interface 108 can be a computer monitor, a television, a loudspeaker, a computer speaker, or any other known device operatively connected to the computing device 100 and configured to output information to the user. A user input can be received through the user interface 108 implementing a keyboard, a mouse, or any other known device operatively connected to the computing device 100 to input information from the user. Alternatively, the user interface 108 can be implemented by any known touchscreen. The computing device 100 can include a server, a personal computer, a laptop, a smartphone, or a tablet.

Referring to FIG. 3, the graphic user interface (GUI) 200 can implement the graphic user interface 38 shown in FIG. 1. The GUI 200 can include a plurality of input fields 202, 204, 206, 208 configured to receive user inputs to enter a username, a password, an IP address, and a command, respectively. The GUI 200 further includes a plurality of actuatable icons 210, 212, 214, 216, 218. By clicking with a mouse or tapping with a finger or stylus on the icon 210, the user operates the network management tool implemented by the network management system 12 to be executed to run, as described herein. By clicking with a mouse or tapping with a finger or stylus on the icon 212, the user operates the network management tool implemented by the network management system 12 to generate a report using the reporting system 30. By clicking with a mouse or tapping with a finger or stylus on the icon 214, the user operates the network management tool implemented by the network management system 12 to clear the input fields 202, 204, 206, 208. By clicking with a mouse or tapping with a finger or stylus on the icon 216, the user operates the network management tool implemented by the network management system 12 to browse the memory 24 for IP addresses associated with at least one of the network devices 14, 16, 18. The IP addresses can be in the IPv4 format with an internal IP range such as 10.xx.xx.xx. The IP addresses can be separated by a delimiter such as a comma, or separated by a new line.

By clicking with a mouse or tapping with a finger or stylus on the icon 218, the user operates the network management tool implemented by the network management system 12 to browse available commands listed in the memory 24. The user can, for example, reset the network devices passwords using the following example commands: passwd, password, exit.

The GUI 200 can also include a progress bar 220. While the network management system 12 executes a command to a network device 14, 16, 18, the network management system 12 can be configured to also determine the amount of progress in executing the command. The processor 22 of the network management system 12 can be configured to determine the amount of progress in a known manner. For example, as the command is being executed on a given network device 14, the network device 14 can send a status signal or an acknowledgement signal to the processor 22 indicating the state of the execution of the command on the network device 14. In turn, the processor 22 is configured to send a progress signal to the input/output device 26, with the progress signal representing the state of the execution of the command. Furthermore, the input/output device 26 updates the progress bar 220 on the GUI 200 to represent the amount of progress of the execution of the command. Alternatively, the GUI 200 can be configured to display a percentage of progress, ranging from zero to one hundred, to represent the amount of progress of the execution of the command.

Figure 4:
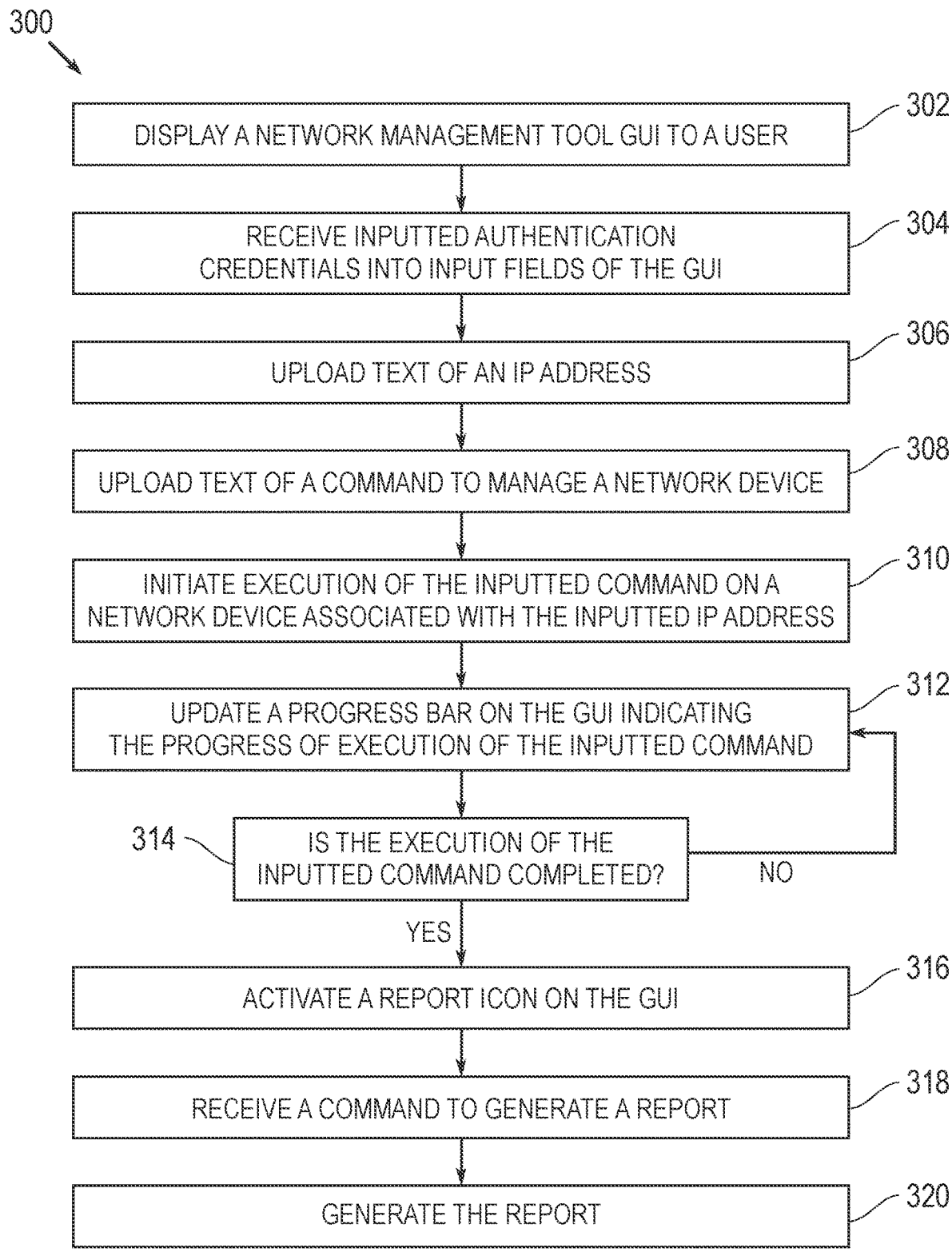
FIG. 4 is a flowchart of a method of operation of the system of FIG. 1.

Referring to FIG. 4, a method 300 of operation of the network management system 12 includes the steps of displaying a network management tool GUI 200, shown in FIG. 3, to a user in step 302. The method 300 then receives authentication credentials input to the GUI 200 in step 304. The user can be a system administrator, an end user, or a data analyst. The authentication credentials include at least a username and a password, which are inputted into the input fields 202, 204. Alternatively, the user can be required to enter other authentication credentials such as a telephone number, an Email address, a personal identification number (PIN), or an access code transmitted to the user through the telephone number or through an Email address. Once the network management system 12 authenticates the user, the method 300 allows the user to enter text of an IP address into the input field 206, with the IP address associated with at least one network device 14, 16, 18, and the method 300 uploads the text of the IP address in step 306. The text of the IP address can be a string of characters, or can be a text file. Upon authentication of the user, the method 300 also allows the user to enter text of a command to manage at least one network device 14, 16, 18, and the method 300 uploads the text of the command in step 308. The text of the command can be a string of characters, or can be a text file. Responsive to the user actuating the run icon 210, the method 300 initiates execution of the input command on the network device associated with the input IP address in step 310.

The method 300 updates a progress bar 220 on the GUI 200 in step 312 indicating the progress of execution of the input command. The method 300 then checks whether the execution of the input command is complete in step 314. If not, the method 300 loops back to step 312 to further update the progress of the execution of the input command. Otherwise, if the execution of the input command is complete in step 314, the method 300 activates the report icon 212 in step 316, to allow the user to initiate generation of a report by the reporting system 30. The method 300 then receives a command to generate the report in step 318, and the reporting system 30 generates the report in step 320 to be output by the input/output device 26.

Figure 5:
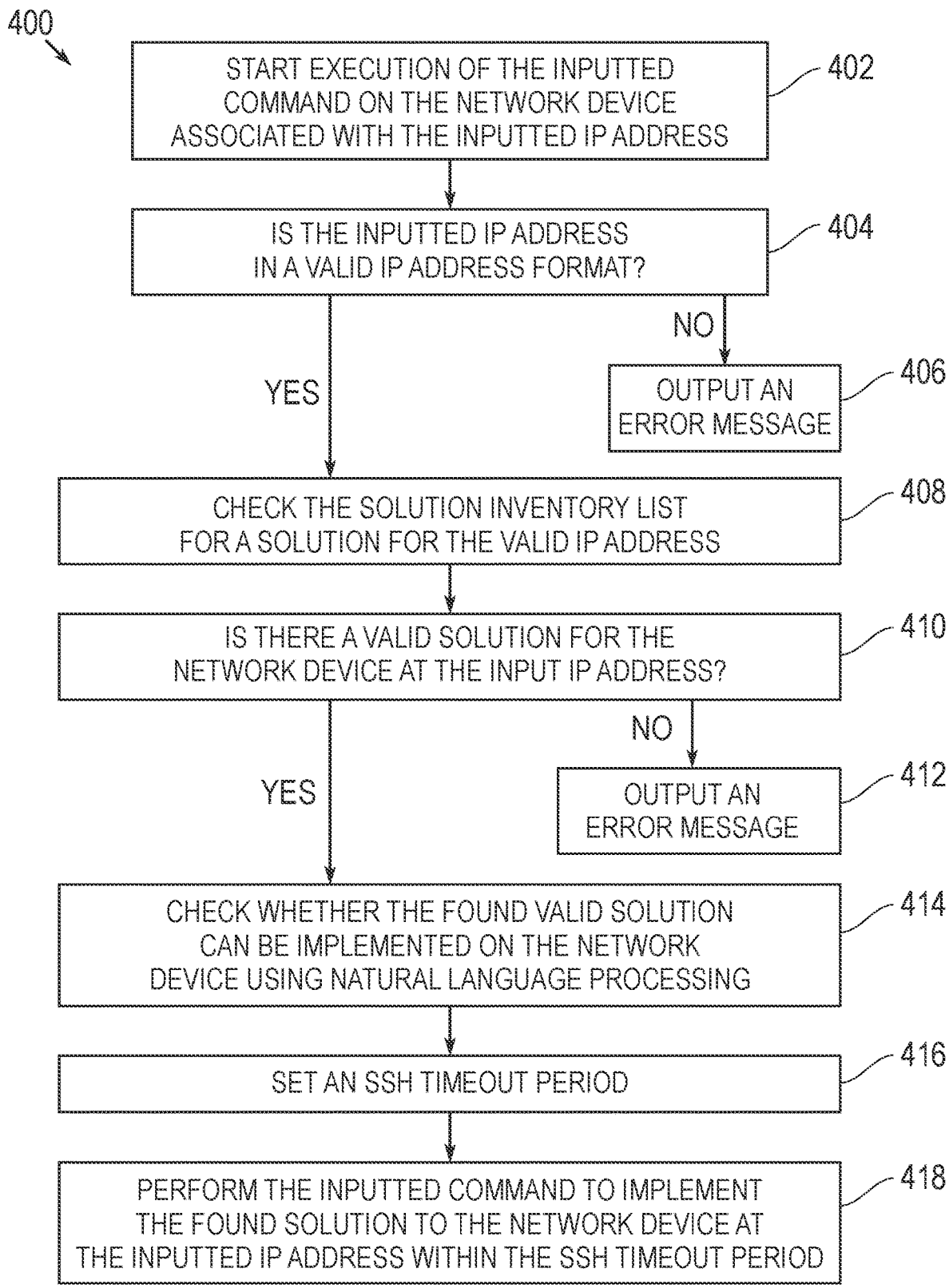
FIG. 5 is a flowchart of execution of an input command.

Referring to FIG. 5, the execution of an inputted command is shown in the method 400 including starting execution of the inputted command on a given network device associated with the inputted IP address in step 402, and checking whether the inputted IP address is in a valid IP address format in step 404. If the input IP address is not in a valid format, the method 400 outputs an error message to the user using the input/output device 26 in step 406. Otherwise, the input IP address is in a valid IP address format, and so the method 400 proceeds to step 408 to check the solution inventory list 34 for the input IP address using the parsing system 28. If there is no valid solution in the solution inventory list 34 for the given network device at the input IP address in step 410, the method 400 outputs an error message to the user using the input/output device 26 in step 412. The error message output in step 412 can also include a suggestion to the user to provide a different solution for the given network device. The suggestion can include a solution to fix an issue with the given network device.

However, in step 410, if a valid solution is found in the solution inventory list 34 for the given network device, the interactive system 32 checks the found solution in step 414 using the natural language processing (NLP) system 44 to determine whether the found solution in the solution inventory list 34 can be implemented on the given network device. The NLP system 44 interacts with the given network device to detect any errors in the implementation of the found solution. For example, the NLP system 44 can evaluate a command prior to execution of the command to detect syntax errors, and provide suggested corrections.

In one example embodiment, the NLP system 44 can implement a neural network 46. The neural network 46 can be trained by inputting predetermined solutions to the neural network 46 and outputting network device configurations. Accordingly, once trained, the neural network 46 can accurately evaluate whether a found solution corresponding to an input IP address can be implemented on the associated network device.

Once the found solution is checked in step 414, the method 400 proceeds to step 416 to set a timeout period for a Secure Shell (SSH) communication between the network management system 12 and the given network device. The SSH timeout is performed by the smart scheduling system 40, which uses a ping time between the network management system 12 and the given network device to determine the success of the implementation of the found solution on the given network device. Based on a predetermined formula, the smart scheduling system 40 calculates the SSH timeout period to be used, during which the found solution is implemented on the given network device. The use of the SSH timeout period ensures that the found solution efficiently and effectively interacts with the given network device. For example, the predetermined formula multiplies the average ping of a network device by the constant factor 1.5 to obtain the SSH timeout period. The average ping of the network device is first determined to know how far the given network device is in milliseconds. The constant factor 1.5 can be the default value, which can be modified slightly by a system administrator to make sure that the network devices are responsive.

The SSH communication between the network management system 12 and the given network device is conducted using the encryption system 42 to perform the inputted command in step 418 of the method 400 to implement the found solution to the given network device at the inputted IP address within the SSH timeout period. The encryption system 42 can use any known encryption method.

As described above, the network management system 12 can automatically implement input commands and network device solutions on a single network device, such as the network device 14. However, the network management system 12 is scalable to push network device solutions to multiple network devices 14, 16, 18. The pushing of network device solutions can be performed systematically one-by-one automatically from the network management system 12 to the multiple network devices 14, 16, 18. Alternatively, the pushing of network device solutions can be performed in parallel using multiple computing threads from the network management system 12 to each of multiple network devices 14, 16, 18.

Accordingly, the network management system 12 can be utilized by a system administrator to input different IP addresses of different networks devices 14, 16, 18 through the input field 206 of the GUI 200, and to input different commands through the input field 208 of the GUI 200 to automatically configure multiple network devices 14, 16, 18 automatically. For example, using the network management system 12, the system administrator can reset local passwords on network devices through the GUI 200. Alternatively, the system administrator can commission network devices with required configurations through the GUI 200. In another alternative embodiment, the system administrator can simultaneously close vulnerabilities on multiple network devices 14, 16, 18 through the GUI 200.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A network management system operatively connected to a plurality of network devices, comprising:
   a memory configured to store a solution inventory list of network solutions of the network devices;
   an input/output device having a first processor including first code therein configured to receive Internet Protocol (IP) addresses and to receive commands;
   a parsing system having a second processor including second code therein configured to check the case that the IP addresses and the commands are valid, and to search the solution inventory list for found solutions associated with the plurality of network devices based on the IP addresses;
   an interactive system having a third processor including third code therein configured to interact with the plurality of network devices, to perform natural language processing of the interactions with the plurality of network devices, to set a timeout period, and to execute the commands to implement the found solutions to the network devices to configure the network devices during the timeout period; and
   a reporting system having a fourth processor including fourth code therein configured to generate a report indicating the case that the commands are successfully executed,
   wherein the input/output device is configured to output the report.

2. The network management system of claim 1, wherein the input/output device includes an interactive display configured to display a graphical user interface (GUI).

3. The network management system of claim 2, wherein the GUI includes a plurality of input fields configured to receive text corresponding to the IP addresses and the commands.

4. The network management system of claim 2, wherein the GUI includes a progress bar configured to represent a progress of execution of the commands.

5. The network management system of claim 1, wherein the parsing system is configured to check the IP addresses using a regular expression (REGEX) method.

6. The network management system of claim 1, wherein the interactive system is configured to perform the natural language processing using a trained neural network.

7. The network management system of claim 1, wherein the interactive system is configured to set the timeout period using a predetermined timeout formula.

8. The network management system of claim 1, wherein the interactive system is configured to encrypt communications between the interactive system and the plurality of network devices using a secure shell (SSH) library.

9. The network management system of claim 1, wherein the report has a format selected from the group consisting of: Portable Data Format (PDF), HyperText Markup Language (HTML), Standard Generalized Markup Language (SGML), Extensible Markup Language (XML), text, and Email.

10. A method, comprising:
    storing, in a memory, a solution inventory list of network solutions of network devices;
    receiving Internet Protocol (IP) addresses and commands;
    validating the IP addresses and commands;
    searching the solution inventory list for found solutions based on the IP addresses;
    performing natural language processing of interactions with the network devices;
    setting a timeout period; and
    executing the commands to implement the found solutions to configure the network devices during the timeout period.

11. The method of claim 10, further comprising:
    displaying a graphic user interface having a plurality of input fields on a display,
    wherein the receiving step includes receiving the IP addresses and commands in the plurality of input fields.

12. The method of claim 10, further comprising:
    generating a report indicating successful execution of the commands; and
    outputting the report to a user through an output device.

13. The method of claim 10, further comprising:
    providing a trained neural network,
    wherein the performing the natural language processing of interactions includes:
    applying the interactions to the trained neural network to detect errors in the found solutions.

14. The method of claim 10, wherein the executing of the commands further comprises:
    communicating with the network devices using Secure Shell (SSH) communications.

15. The method of claim 10, wherein the step of setting includes setting the timeout period using a predetermined formula.

\* \* \* \* \*